Nov. 18, 1969  F. H. ECKARDT  3,478,843
MIST TYPE COOLANT SPRAY UNIT
Filed June 6, 1968  3 Sheets-Sheet 1

INVENTOR,
FRED H. ECKARDT
BY Watson, Cole, Grindle & Watson
ATTORNEYS

Nov. 18, 1969  F. H. ECKARDT  3,478,843

MIST TYPE COOLANT SPRAY UNIT

Filed June 6, 1968  3 Sheets-Sheet 2

INVENTOR,
FRED H. ECKARDT

BY Watson, Cole, Grindle & Watson
ATTORNEYS

Nov. 18, 1969        F. H. ECKARDT        3,478,843
MIST TYPE COOLANT SPRAY UNIT
Filed June 6, 1968        3 Sheets-Sheet 3
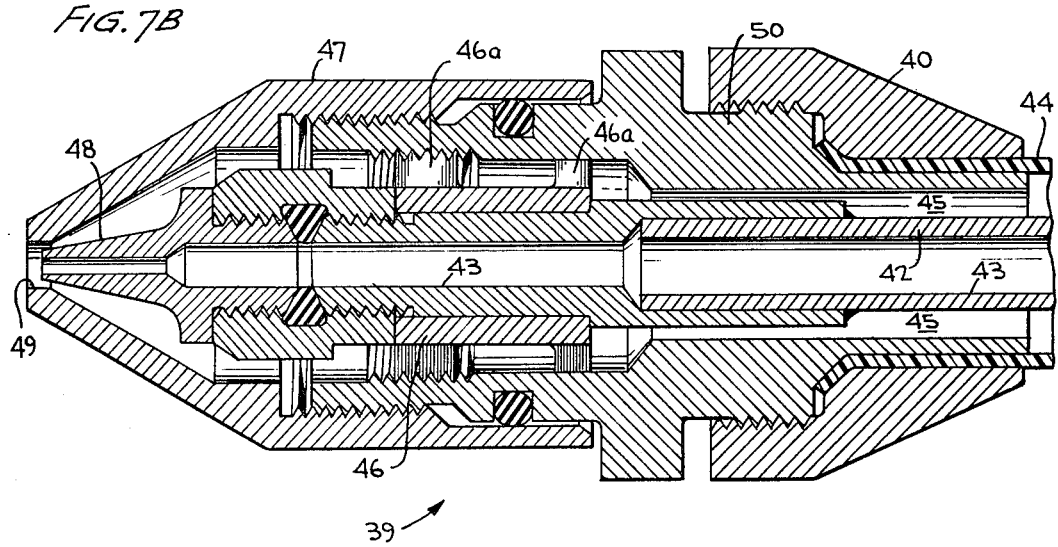
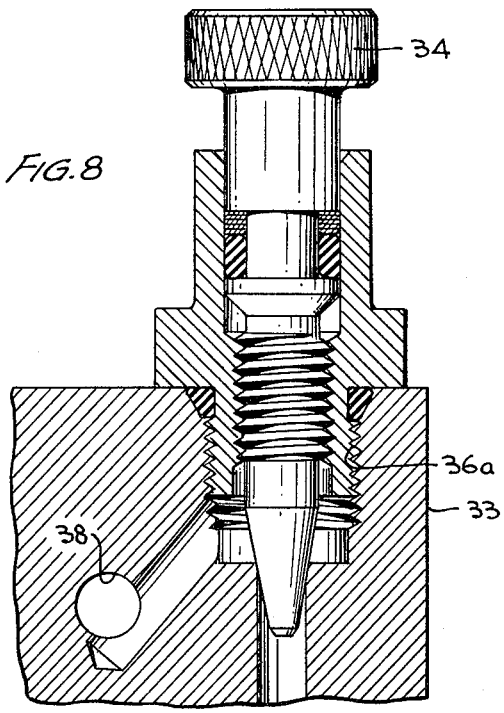
INVENTOR,
FRED H. ECKARDT
BY
Watson, Cole, Grindle & Watson
ATTORNEYS United States Patent Office 3,478,843
Patented Nov. 18, 1969

3,478,843
MIST TYPE COOLANT SPRAY UNIT
Fred H. Eckardt, Stirling, N.J., assignor to Daystar Corporation, Roselle, N.J., a corporation of New Jersey
Filed June 6, 1968, Ser. No. 735,111
Int. Cl. F01m 1/00; F16n 29/00, 7/32
U.S. Cl. 184—6       12 Claims

ABSTRACT OF THE DISCLOSURE

A method and apparatus for simultaneously cooling and/or lubricating a cutting tool with a fine mist spray from a unitary, variably adjustable spray nozzle by providing pressurized air, coolant and lubricant lines, conducting each line to a mixing block, adjusting the flow rate of air, coolant and lubricant at the mixing block and intermixing the coolant and lubricant therein, and, with the air, atomizing the mixture at the point of delivery with the cutting tool.

---

Figure 1:
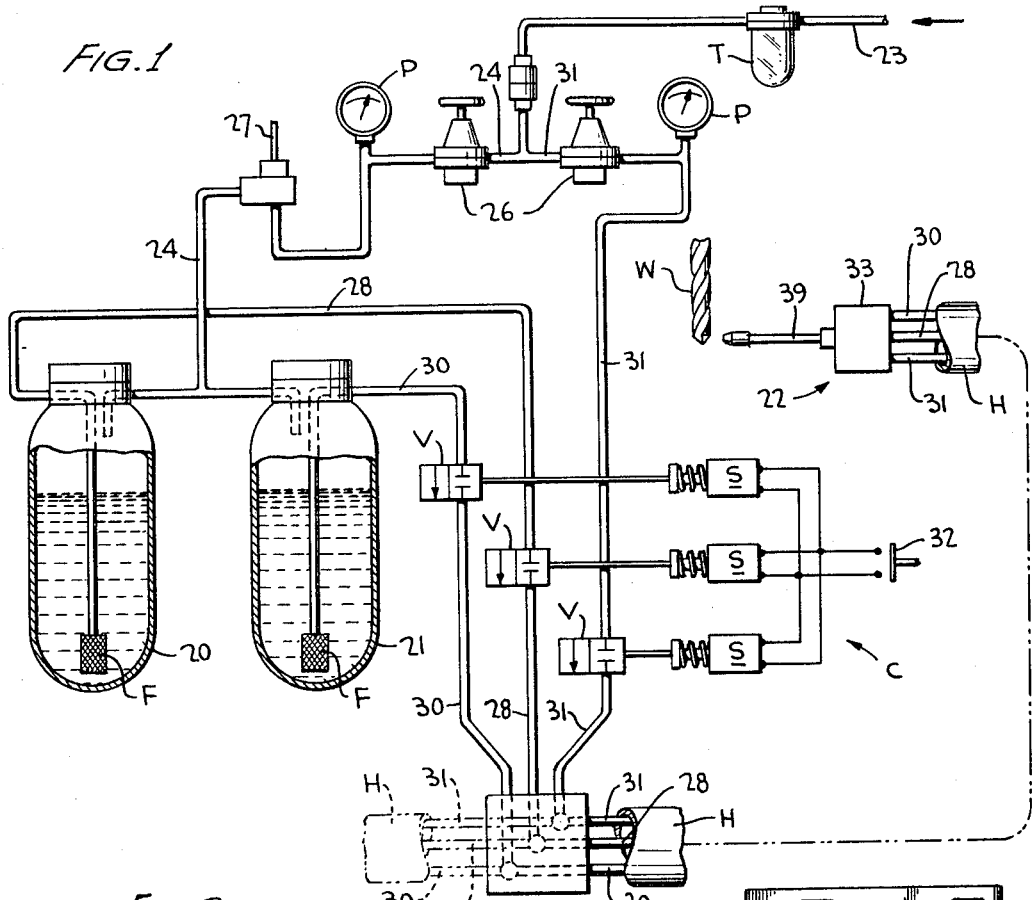

This invention relates, generally, to a method and apparatus for mist-cooling cutting tools and more particularly to a device and method for applying air, coolant and/or lubricant to metal machining operations in a fine mist spray.

Over the past several years, metalcutting has become a more and more expensive operation, one of the reasons being that a worktable lubrication system for one machining operation is not feasibly workable for another. For example, optimum tool geometry for handling most sets of conditions is known, but a general purpose form is used. Optimum speeds of cutting tools and optimum cooling feed rates are known, but averages are nevertheless used. The various types of coolants and lubricants used as cutting fluids have been developed to meet many cutting situations, but a general purpose fluid is consistently being used largely in the interest of economy. Also, different methods of applying these fluids have been developed so that each is best for a series of requirements but only one method is usually used on all jobs. In all of these, a successful metal machining lubrication system must be capable of lubricating the cutting operation by means of maintaining a fine lubricant film between the cutting tool and the work piece. Also, the lubricant or coolant must remove heat from the cutting tool and the work piece as it is generated by the cutting operation. Furthermore, the system must be capable of removing the cutting shavings from the path of the cutting tool to thereby assure a free cutting surface at all times. It can be seen therefore, that to adequately perform such a wide variety of machine cutting operations, while sufficiently cooling, lubricating, and removing shavings in each instance, a myriad of lubricant, coolant, and air spray units of all types are needed in the shop if a reliable cooling-lubricating operation is to be carried out. The techniques and processes commonly available are inedequate to economically fulfill such a wide variety of needs in machine-cutting operations because one spray system must be substituted for another when a new need of cooling or lubricating or applying air pressure arises. In some machine operations, the removal of heat from the cutting tool is more critical than the need for a heavy lubricant. Moreover, some machining operations require only normal-grade lubricants because the low heat conductivity of the particular lubricant is sufficiently adequate and is more economical over long periods of use. It becomes abundantly clear, therefore, that a system which incorporates the use of coolant, lubricant and air into one proves to be a tremendous advantage for the operator if he is able to manually regulate the flow rate of each medium in accordance with desired machine-cutting operations.

The present invention is therefore characterized by a method and single apparatus for both cooling and lubricating a cutting tool with a fine mist spray through a nozzle means comprising a valve block and a spray nozzle. Pressurized air, coolant and lubricant lines are provided on the valve block and flow rate regulating valves are provided on the block for adjusting the quantity of emitted air, coolant and lubricant toward the workpiece or cutting tool. Within the valve block, the coolant and lubricant are intermixed, when desirable, and the nozzle is so constructed as to permit the pressurized air to atomize the coolant and/or lubricant at the discharge end of the nozzle, thereby forming a fine mist spray for both cooling and lubricating the cutting tools.

It is therefore an object of the invention to provide a method and apparatus for delivering a fine mist spray of both coolant and lubricant to a cutting tool through a unitary device.

It is a further object of this invention to provide a mist cooling and lubricating method and apparatus in which the air, coolant and lubricant may be regulated at a mixing station within easy access by the operator so that any combination of air, coolant and lubricant is possible for a wide variety of machine-cutting operations.

Another object of this invention is to provide an improved cooling and lubricating system wherein coolant and lubricant is intermixed by the operator at his discretion before it reaches the nozzle discharge end.

A still further object of this invention is to provide a technique and device for cooling and lubricating, by means of a fine mist spray, a cutting tool wherein air pressure forms the mist spray by atomizing the coolant and lubricant at the discharge end of the nozzle.

Figure 2:
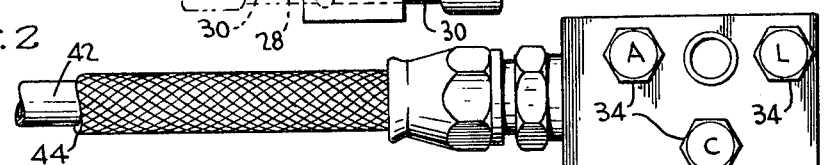
Figure 3:
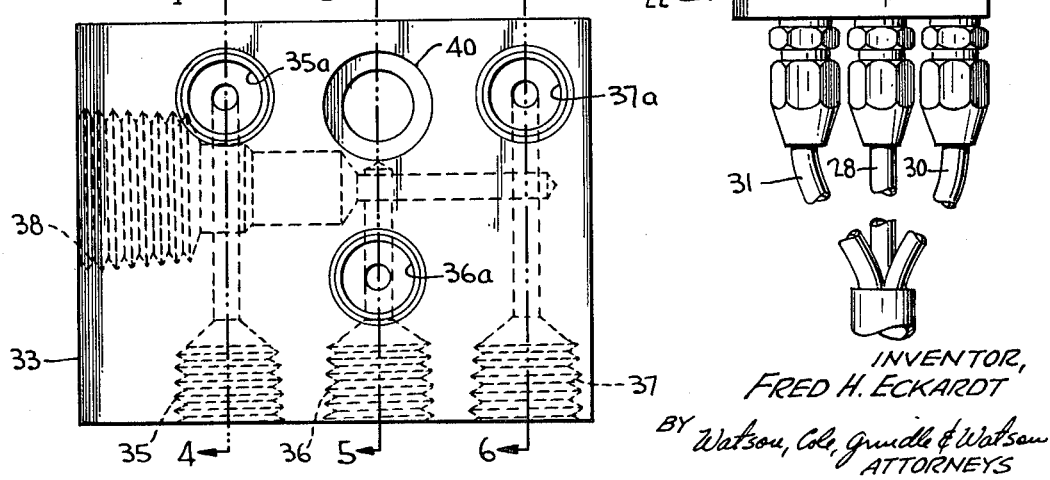
Figure 4:
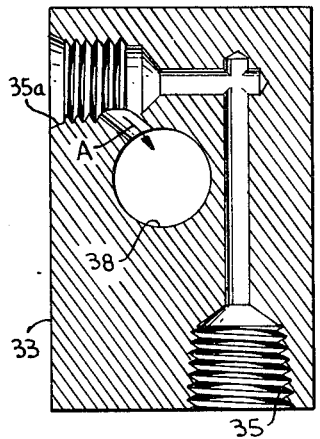
Figure 5:
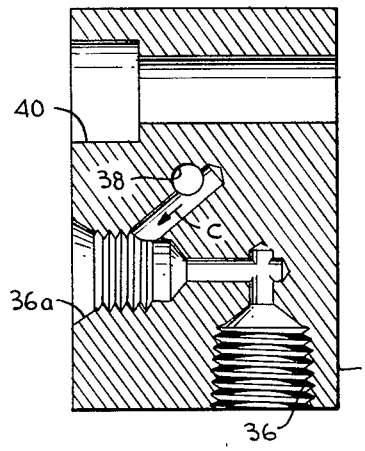
Figure 6:
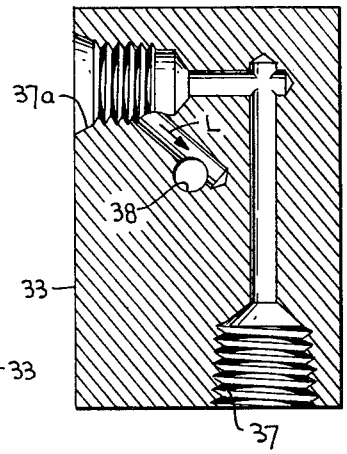
Figure 7A:
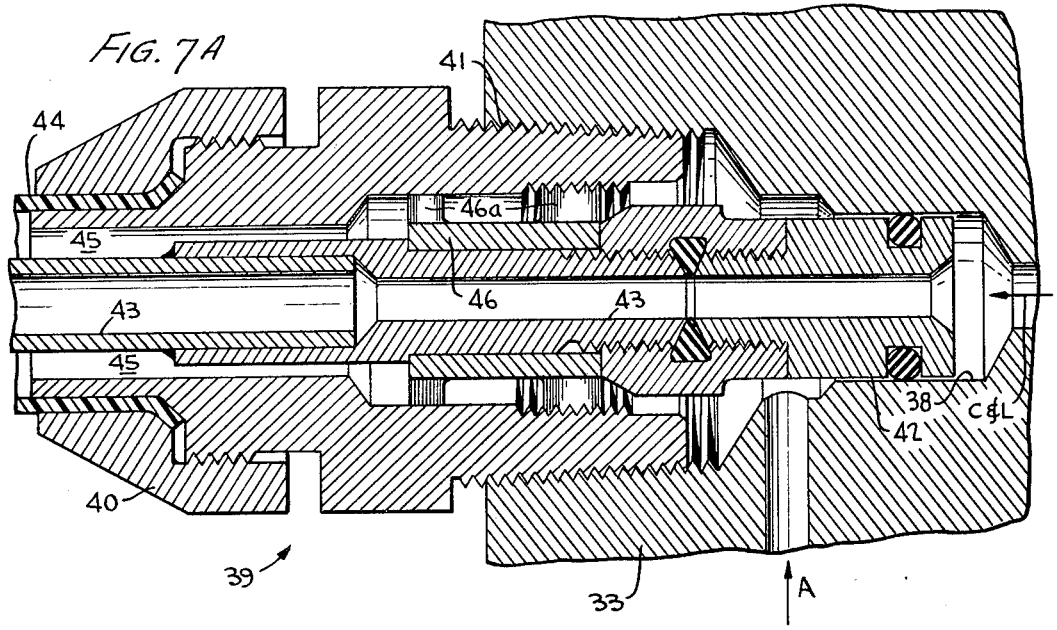

These and other objects of the invention will best be understood and appreciated from the following description shown in the accompanying drawings in which:

FIGURE 1 is piping diagram for the mist spray unit;
FIGURE 2 is a side view perspective of the mixing station or valve block for the spray nozzle with the nozzle and pressure lines attached;
FIGURE 3 is a side view of the valve block with the valve plugs removed;
FIGURES 4, 5 and 6 are sectional views taken, respectively, at lines 4, 5 and 6 of FIGURE 3;
FIGURE 7(A) is a partial view in longitudinal cross-section of the spray nozzle seated in the valve block;
FIGURE 7(B) is a partial view in longitudinal cross-section of the spray nozzle showing the discharge end; and,
FIGURE 8 is a cross-sectional view showing a portion of the valve block with a valve plug completely inserted.

Referring now to the drawings wherein like characters refer to like and corresponding parts throughout the several views, there is shown in FIGURE 1, a piping diagram of the mist spray system according to the instant invention. Closed tanks 20 and 21 provide, respectively, the necessary coolant and lubricant to a nozzle means generally indicated by numeral 22. Each of the tanks 20 and 21 are provided with a filter F for purposes of filtering the fluid before entering their pressure lines. A source of compressed air or other suitable gas is provided to a pipe 23, past a sediment trap T and through a juncture into each of lines 24, 31. Air control regulators 26 are provided in each line 24, 31 along with an air pressure indicator P. Air pressure through air line 24 is conducted to each of the tanks 20, 21, through an exhaust valve 27 whereby the pressure can be quickly exhausted from each tank prior to replenishing the liquid supply in the tanks. A coolant line 28 from tank 20 conducts pressurized coolant to a junction box 29 through a valve V. Pressurized lubricant is similarly conducted through a line 30 to the junction box 29 and air pressure through air line 31 to box 29. Each of the lines 30, 31 are provided with valves V corresponding to the valve on line 28 which valves are normally closed and are respectively connected to the cores of solenoids S. The solenoids are wired into a circuit C having a normally open push-button switch 32 therein. When the switch is closed, all three solenoids are simultaneously energized and simultaneously open their corresponding valves to permit the flow of air, coolant and lubricant to the juncture sation 29. Air, coolant and lubricant is thereafter conducted to a valve block or mixing station 33 of nozzle means 22. In FIGURE 2 of the drawings, lines 28, 30 and 31 are shown secured to the valve block 33 by conventional coupling connections. A valve plug 34 in the valve block is associated with each line 28, 30 and 31 for controlling the flow rate of the valve block 33 as hereinafter described. Each plug may be marked with an A, C and L, as shown in order to properly identify the air coolant and lubricant lines, respectively, the valve block 33 has tapped recesses 35, 36, 37 (see FIGURES 3, 4, 5 and 6), which receive the aforementioned coupling connections. Each recess communicates with a transverse bore or passageway 38 internally threaded for a nozzle 39 and has an associated tapped bore 35a, 36a, 37a, respectively, for receiving plugs 34. As clearly shown in FIGURES 4, 5 and 6, each bore intersects its respective recess at right angles and has a short passage near its base for channelling air, coolant and lubricant to transverse bore 38 as indicated by the arrows A, C and L, respectively. FIGURE 8 shows the manner of adjusting the flow rate of coolant by opening and closing bore 36a through the manipulation of plug or needle valve 34. Although not shown, plugs 34 are similarly threaded into their respective bores 35a and 37a. A through-bore (see FIGURES 3 and 5) is also provided in valve block 33 to facilitate the mounting of the nozzle means 22 if desired during the machining operation.

Referring now to FIGURE 7A of the drawings, the nozzle 39 is in threaded engagement with the valve block 33 by means of its outer sleeve 41. An inner conduit 42 of the nozzle 39 is seated within a portion of the bore 38. Conduit 42 forms a passageway 43 which extends longitudinally to the discharge end of the nozzle. The sleeve 41 and a conventional coupling 40 secure a hose 44 onto the nozzle. A stabilizer 46, slotted at 46a around its periphery, maintains sleeve 41 axially separated from conduit 42 thereby forming a passageway 45 for a flow of air to the outside of conduit 42 from the air inlet as indicated by air arrow A. Hose 44 permits air flow toward the discharge end of the nozzle. As shown in FIGURE 7A, seating of the nozzle in this manner prevents the air flow from intermingling with the coolant-lubricant (shown by arrows C and L) in the valve block.

It should be recognized that inner conduit 42 comprises a plurality of tubes which form a longitudinal conduit and will not be described in detail because they are largely conventional.

In FIGURE 7B of the drawings, the discharge end of the nozzle is shown having an adjustable cap 47 on a sleeve 50 for adjusting the axial movement of the nozzle end in relation to an interchangeable tip 48 which forms an extension of inner conduit 42. A stabilizer 46, similar to stabilizer 46 described in FIGURE 7A, maintains axial separation between sleeve 50 and conduit 42 for the passageway 45 and, slots 46a, around the periphery of stabilizer 46, permit air flow to the discharge end. A coupling 40, similar to that shown in FIGURE 7A, secures the hose 44 onto the sleeve 50. The sleeve 47 is provided with a nozzle aperture 49 throguh which the mist spray is directed to the work piece or cutting tool.

For a complete understanding of the instant mist cooling operation, reference is made to FIGURE 1 which shows that a complete regulation of air pressure is provided by regulator means 26. The pressure in lines 28, 30 and 31 are thereby controlled and equal balance can, in this way, be established between the fluid pressure and the air pressure regardless of the length of the lines. Also the air pressure regulators can be adjusted to rectify possible differences of interior resistance in these lines. Therefore, the air pressure may suitably be adjusted higher than the fluid pressure or vice versa depending upon the nozzle elevation from the floor. When the switch 32 is thrown and the lines 28, 30 and 31 are open, air, coolant and lubricant is conducted to valve block 33 wherein plugs 34 are readily adjustable for controlling the flow rate of the air, coolant and lubricant independently of each other by the operator himself. In this way, the coolant and lubricant in the valve block 33 may be intermixed in transverse bore 38 before being introduced into passageway 43 of the nozzle. The pressurized air is not yet intermingled with the coolant-lubricant mixture because of inner conduit 42 which blocks its entry at the seated end of the nozzle as shown in FIGURE 7A.

The coolant-lubricant mixture is not atomized until it reaches the nozzle end at orifice 49. There, the mixture is completely intermingled and atomized just prior to its being sprayed onto the work piece. By means of the valves 34 in the valve block 33, the coolant system of the instant invention is rendered uniquely universal as a multi-purpose system capable of servicing almost any job. It is so flexible that its use not only provides all the advantages of properly-selected and properly-applied cutting fluids but also can be adjusted to optimize most of the various metalcutting factors. In this system, the operator merely adjusts the air, coolant and lubricant valves 34 individually to deliver to the cutting area whatever combination of air, coolant and lubricant he desires at whatever pressure he deems fit and at whatever flow rate necessary for the particular cooling job at hand. Since these adjusting means are at the machine operator's station, there is never any reason to use anything but the best settings. In addition, during some long cutting operations, the valve settings may be altered to minimize the effects of tool wear. For a drilling-tapping sequence, for example, the valve stems 34 would be adjusted to provide a mixture of coolant-lubricant for drilling, but only the lubricant for the tapping operation. When setting up a cutting operation, the valve block controls are set to give the proper flow rate the proper pressure and the proper mixture of air, coolant and lubricant (from zero to 100% of each if necessary) to acknowledge tool geometry, condition and material, surface-finish requirements, work piece material, and cutting speeds and feeds. For proper operation of the instant cooling system, a coolant should be used having a maximum dilution ratio of approximately 25 to 1 and an undiluted lubricant of a highly refined synthetic should preferably be used. Because of the versatility of these two fluids and their infinite combinations, maintenance of cutting fluid supplies in storage is reduced to an absolute minimum. Also, because pressure and flow are precisely controlled, fogging of the plant is minimized since only the correct amount of mist is delivered to the cutting tool or work piece. Flood cooling, on the other hand, can also be accomplished when desired. A controlled mist delivery system according to the instant invention not only conserves fluids but it avoids a potential health hazard. It even conserves building heat during the winter because more plant air can be recirculated without the need for expelling fog-laden air outside. All of the components of this system are easy to reach for the small amount of maintenance required. Even maintenance is minimized because neither the cooling system nor the machine tool has to be cleaned between runs. The machine tool will perform better for longer periods of time when copius flow of cutting fluids is not used. Bearings are not apt to be flooded and there is little or no contamination of the machine lubricants. When mist fluids can be used, tool life is increased and the evaporative cooling effect adds from 25% to 100% to the life of a tool when compared with flood cooling results. The instant cooling system is self-contained and requires only connections to the shop airline and 110 volts AC current hookup. Up to approximately 20 feet of hose can be used between the tank manifold or junction station 29 and the operator's mixing block so the bulk of the unit can be out of the way. The armoured nozzle hose H containing the lines 28, 30, 31, can be, for example, 10 inches, 15 inches or 20 inches long.

The manifold or junction box 29 is designed to facilitate connection of additional air, coolant or lubricant lines as shown in phantom in FIGURE 1. Accordingly, two independent nozzle spray units may be used from the same system.

The invention has been described in an illustrative manner and it is to be understood that the terminology which has been used herein is intended to be of the nature of words of description rather than of limitation.

What I claim is:

1. A method of simultaneously cooling and lubricating a cutting tool with a fine mist spray comprising the steps of providing a source of air at a predetermined pressure, conducting air therefrom toward a cutting tool through a mixing station, conducting a flow of coolant at a predetermined pressure to said station, conducting a flow of lubricant at a predetermined pressure to said mixing station, intermixing said coolant and said lubricant at said mixing station, conducting the intermixed coolant and lubricant toward said cutting tool, and atomizing said intermixture by means of said pressurized air at the point of delivery to said cutting tool whereby the coolant and lubricant is completely intermingled and conducted to said tool.

2. The method defined in claim 1 comprising, in addition, regulating the pressure of said conducted air and fluid to establish an equal pressure balance therebetween.

3. The method defined in claim 2 comprising, in addition, providing means for controlling the flow rate of air coolant and lubricant at said mixing station whereby the flow of each may be suitably adjusted for a variety of cooling needs.

4. The method defined in claim 3 comprising, in addition, first conducting said pressurized air, coolant, and lubricant to a junction station for accommodating an additional mixing station therefrom.

5. An apparatus for delivering a mist spray of coolant and lubricant onto a cutting tool comprising a combination, a closed tank adapted to hold a supply of coolant, a closed tank adapted to hold a supply of lubricant, a nozzle means for conducting the mist spray onto the cutting tool, said nozzle means comprising a valve block and a spray nozzle, means for supplying air at a predetermined pressure directly to said nozzle means, to said coolant tank, and to said lubricant tank, means for conducting from said coolant tank and from said lubricant tank a pressurized flow of coolant and lubricant to said valve block, said valve block having a passageway therein for intermixing said coolant and said lubricant, said nozzle having a first passageway therein for said coolant-lubricant mixture, said first passageway communicating with said valve block passageway at the seat end of said nozzle, said nozzle having a second passageway for pressurized air, said second passageway communicating with said first passageway at the discharge end of said nozzle whereby said coolant-lubricant mixture is atomized and completely intermingled with said pressurized air to form a fine mist spray for cooling and lubricating the cutting tool.

6. The apparatus of claim 5 further comprising air regulating means on said air supply means for maintaining a balance of air pressure and fluid pressure at said nozzle.

7. The apparatus of claim 6 wherein valve means are provided on said valve block for controlling the flow rate of air, coolant and lubricant therethrough.

8. The apparatus of claim 7 wherein said spray nozzle comprises a body with a hollow bore and hollow stem carried within said bore, said stem forming said first passageway and said bore forming said second passageway, said stem protruding into said valve block a greater distance than said nozzle body so that said valve block passageway and said nozzle second passageway are out of communication within said valve block.

9. The apparatus of claim 5 wherein said means for supplying air comprises a compressed air source and a first distribution line leading from said air source.

10. The apparatus of claim 9 wherein said means for conducting a pressurized flow of coolant and lubricant comprises a second distribution line leading from said first distribution line to said tanks, and a third and fourth distribution line leading from said coolant tank and from said lubricant tank, respectively.

11. The apparatus of claim 10 further comprising a junction unit in said first, second and fourth distribution lines for accommodating an attachment of another nozzle means to the apparatus.

12. The apparatus of claim 10 wherein said air regulating means comprises an air regulator on each of said first and second distribution lines.

References Cited

UNITED STATES PATENTS

| | | |
|---|---|---|
| 2,719,604 | 10/1955 | Allen. |
| 2,850,323 | 9/1958 | Veres _____ 184—55 XR |
| 2,857,019 | 10/1958 | Almasi. |
| 2,946,244 | 7/1960 | Maynard _____ 77—68 XR |
| 3,096,668 | 7/1963 | Maynard _____ 77—68 |
| 3,270,836 | 9/1966 | Rickley _____ 184—55 XR |
| 3,364,800 | 1/1968 | Benjamin et al. ____ 77—55 XR |

FRED C. MATTERN, JR., Primary Examiner

M. ANTONAKAS, Assistant Examiner

U.S. Cl. X.R.

77—68; 184—55